Aug. 9, 1932.  C. H. HOOK ET AL  1,871,057
VALVE MECHANISM
Filed June 18, 1931  2 Sheets-Sheet 1
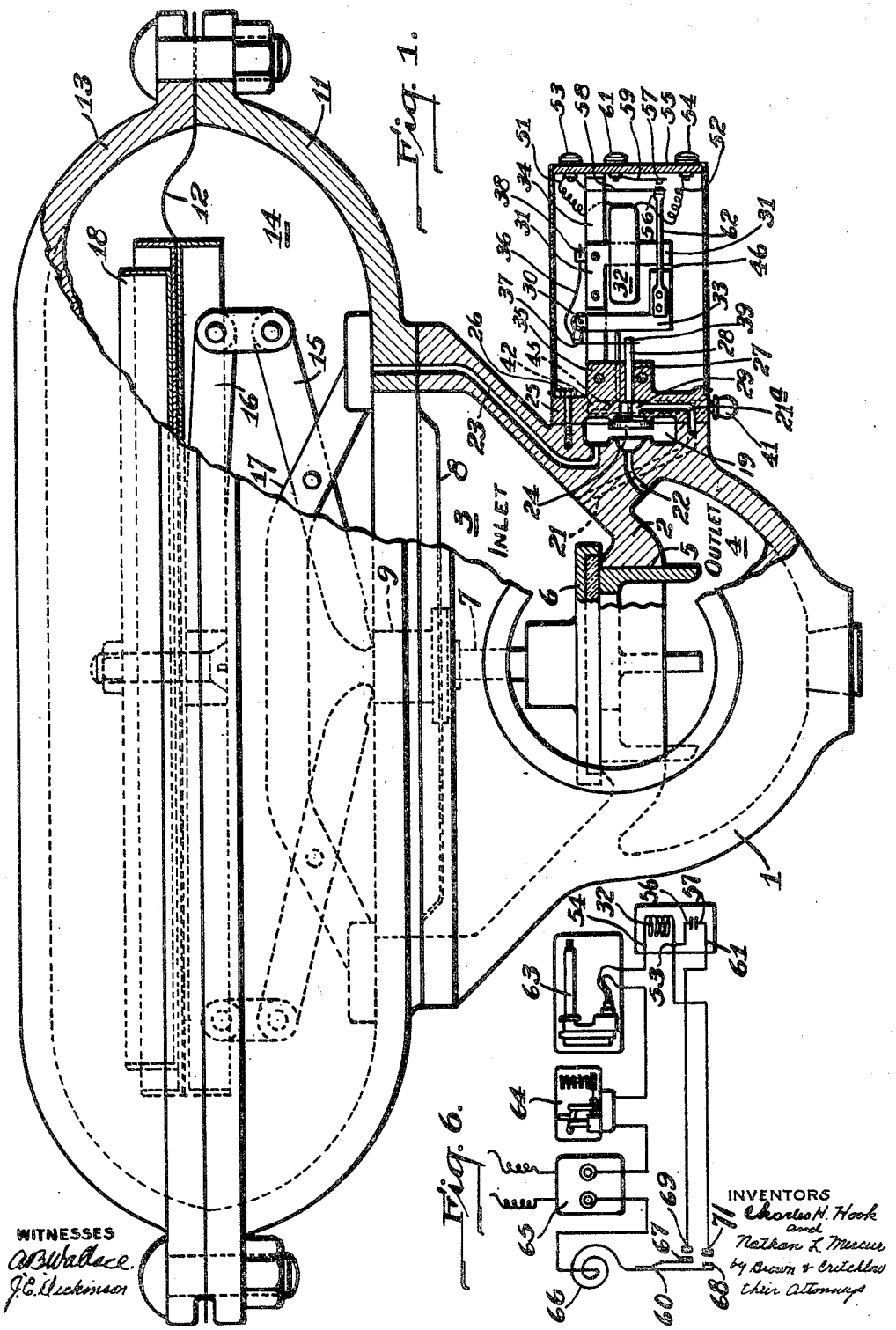
WITNESSES
INVENTORS
Charles H. Hook
and
Nathan L. Mercur
by Brown & Critchlow
their Attorneys

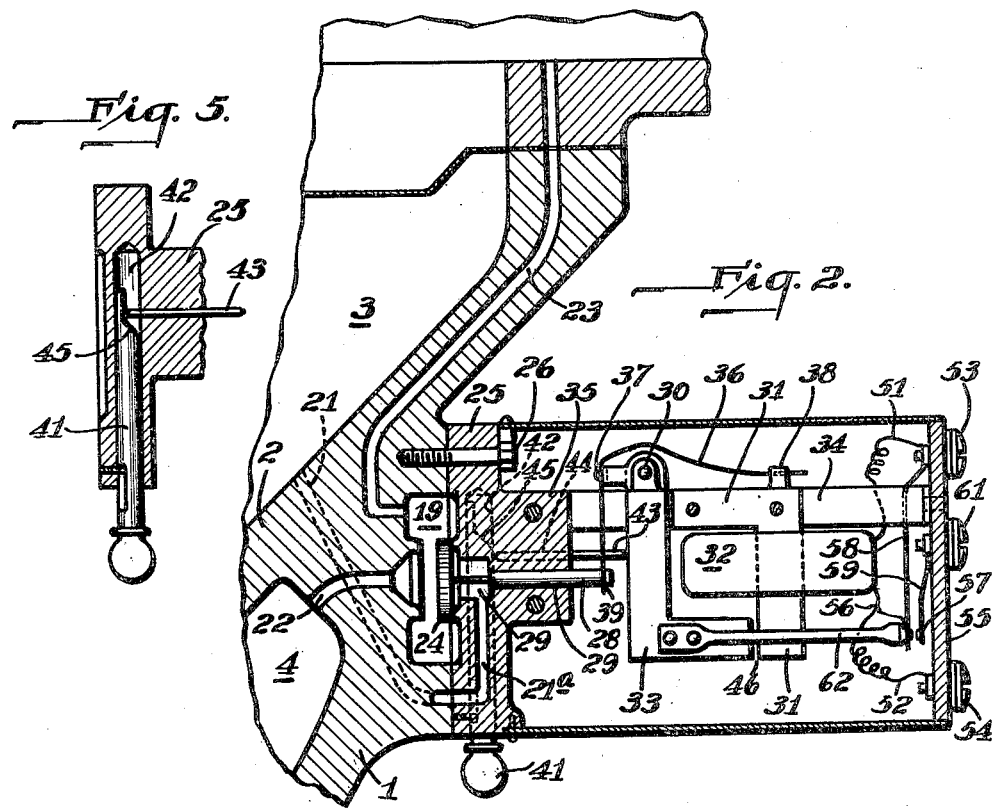
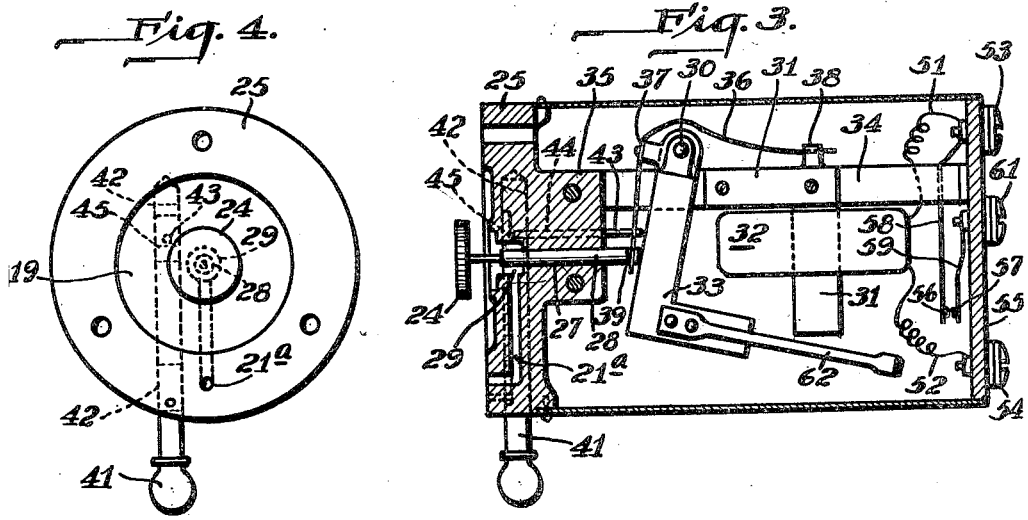

Patented Aug. 9, 1932

1,871,057

UNITED STATES PATENT OFFICE

CHARLES HOWARD HOOK, OF PITTSBURGH, AND NATHAN L. MERCUR, OF McKEESPORT, PENNSYLVANIA

VALVE MECHANISM

Application filed June 18, 1931. Serial No. 545,168.

This invention relates generally to a valve mechanism and more particularly to a magnetically operable pilot valve adapted for use especially with gas flow regulating and shut-off valves, although it may be used with various other similar apparatus.

The primary object of the invention, generally stated, is to provide an improved magnetically operable valve mechanism which is provided with novel means whereby it may be controlled manually as well as electrically.

Another object is to provide a valve mechanism of the nature referred to which is adapted to be controlled manually when deenergized and electrically when energized and to be transferred automatically from manual to electrical control when current is applied to the control circuit completed through it.

A more specific object is to provide a pilot valve mechanism embodying the aforementioned features, which is adapted for use more especially for controlling the operation of diaphragm valves and particularly valves of the type disclosed in U. S. Patent No. 1,764,790 for a valve mechanism, granted to the present inventors June 17, 1930, and in an application Serial No. 425,409, for valve mechanism, filed Feb. 3, 1930, also by the present inventors, such combined valves being intended primarily for controlling the flow of gas to a gas burner.

A further object is to provide a valve mechanism of this character which is of simple and sturdy construction, dependable in operation, and relatively inexpensive to manufacture.

These and other objects as well as the various other novel features and advantages of the invention will be apparent when the following detailed description is read in conjunction with the accompanying drawings, of which Fig. 1 is a view partly in elevation and partly in section of a combined gas flow regulating and shut-off valve mechanism employing a pilot valve mechanism constructed in accordance with this invention; Figs. 2 and 3 sectional views on enlarged scale of the embodiment of the invention shown in Fig. 1, illustrating the valve and its associated actuating mechanism in alternate positions; Fig. 4 a front view of the valve end of the construction shown in Fig. 3; Fig. 5 a sectional view taken on the line V—V of Fig. 4; and Fig. 6 a schematic wiring diagram of a control system designed for use in controlling the operation of a gas fired boiler in accordance with the invention.

Referring to the drawings, the embodiment of the invention illustrated is shown in combination with a combined regulating and shut-off valve mechanism of a type employed both for regulating and positively shutting off the flow of gas to a gas burner. As shown more particularly in Fig. 1, the combined mechanism comprises a casing section 1 which constitutes the body proper of the structure. This is divided by a partition 2 into an inlet chamber 3 and an outlet chamber 4 which are adapted to receive the ends of a pipe line in a pressure system.

In the center of partition 2 there is formed a valve opening 5 which is constructed to receive a valve 6 that is employed to control the flow of fluid from inlet chamber 3 to outlet chamber 4. This valve is connected by a stem 7 to a flexible diaphragm or partition 8 mounted over the top of section 1 which is open at that point, the stem being connected to a flat topped rigid bearing member 9 upon which the ends of levers 15 are arranged to bear as will appear hereinafter.

Above diaphragm 8 there is mounted a dish-shaped casing section 11 and on top of it a second flexible diaphragm 12, the latter being held in place by a cover casing section 13. Casing section 11 and diaphragms 8 and 12 form a pressure chamber 14 which is utilized for controlling the movement of valve 6. To attain this end a pair of levers 15 are employed to transmit to valve 6 any movement of diaphragm 12 which may be produced by varying the pressure in chamber 14. These levers are pivotally attached at their upper ends to a support 16 secured to the under side of diaphragm 12 and midway between their ends in a support 17 secured in chamber 14, the lower ends of the levers being adapted to engage the upper end of bearing member 9. With this arrangement when a pressure is present in chamber 14 diaphragm 12 is forced upwardly and the lower ends of levers 15 downwardly urging valve 6 against its seat. To vary the amount of pressure required to lift diaphragm 12 a weight 18 of any desired value or its equivalent is mounted on the diaphragm. By reason of the use of this weight diaphragm 12 is forced downwardly and the lower ends of levers 15 upwardly when the pressure in chamber 14 is insufficient to overcome the effect of the weight.

In accordance with the structure shown, to render the device operable as a regulating valve, means is provided for communicating the pressure in the outlet chamber 4 to pressure chamber 14 and to cause it to function as a shut-off valve means is provided for shutting off the connection between chambers 4 and 14 and for communicating the pressure in the inlet chamber 3 to pressure chamber 14. The means employed for this purpose comprises a valve chamber 19 formed in casing 1 which is connected by ducts 21 and 22, respectively, with inlet and outlet chambers 3 and 4, and by a duct 23 with pressure chamber 14.

For controlling the connection between inlet and outlet chambers 3 and 4 and pressure chamber 14, a double acting pilot valve 24 is arranged in valve chamber 19. In its outermost position valve 24 closes duct 21 and allows the pressure from outlet chamber 4, which is the pressure on the low pressure or burner side of valve 6, to pass by way of ducts 22, chamber 19 and duct 23 to pressure chamber 14. In its innermost position valve 24 reverses these connections placing chamber 3 in communication with pressure chamber 14. When the latter connection is established the pressures on both sides of diaphragm 8 are the same, consequently valve 6 closes due to its own weight, and at the same time a good seat is insured as the pressure in chamber 14 causes levers 15 to act against stem 7 to force the valve downward, whereby positive operation as a shut-off valve results.

In accordance with this invention a novel form of mechanism is provided for operating valve 24, the embodiment of which as illustrated here comprises a valve body 25 which is adapted to be attached to casing 1 by screws 26 or other suitable means and to form one side of valve chamber 19. Through the center of this valve body there is extended in a horizontal plane an opening 27 in which a stem 28 is fitted for moving valve 24 which is secured to its inner end. One face of the valve is adapted to close the end of passage 21 opening into chamber 19 and the other the corresponding end of passage 22 when they are moved into engagement therewith. To accomplish this end valve 24 is mounted directly opposite the end of duct 22 and duct 21 is carried by way of duct 21a through the valve body 25 to opening 27 which is enlarged at 29 to permit the flow of gas about stem 28 into chamber 19.

For operating valve 24 electrically so that it can be controlled remotely in any desired manner, such as by a thermostat in the case of a furnace operated by the combined regulating and shut-off valve mechanism, an electric magnet is employed which comprises essentially a stationary core 31, a coil 32 mounted thereon and a movable armature 33 pivotally associated with the core. For supporting this magnet a pair of arm-like plates 34 are secured to the opposite sides of an extension 35 on the valve body 25. Core 31 which is formed in the shape of the letter L is mounted with one leg rigidly secured between plates 34 and the other projecting downwardly therefrom. Upon this latter leg coil 32 is mounted. Armature 33 like core 31 is formed in the shape of the letter L and is mounted to complete the magnetic circuit for coil 32 when moved against the lower leg of core 31. As shown in the drawings one end of armature 33 is pivotally mounted at 30 between plates 34 at the end of core 31.

On the upper side of plates 34 there is mounted a spring 36 which is attached at 37 to the upper end of armature 33 and at one end by a projection 38 to plates 34, the spring being flexed in such a fashion as to normally urge the lower end of the armature away from the lower end of core 31. From 37 spring 36 is extended downwardly along the back of armature 33 with its lower end, which is slotted for such purpose, straddling the end of valve stem 28. An annular groove 39 is formed in the end of stem 28 for the reception of spring 36 and is adaptd to engage the split portion of the spring so that the stem and valve 24 are carried back and forth with armature 33 when it is moved. The amount of this movement is such that when the armature is released, as shown in Fig. 3, valve 24 closes duct 22 and when held against spring 36, as shown in Figs. 1 and 2, it closes duct 21. Accordingly, when coil 32 is energized valve 24 is held in its outermost position and valve 6 is caused to function as a regulating valve and normally when deenergized valve 24 is urged to its innermost position by spring 36 and the unbalanced weight of armature 33 causing valve 6 to operate as a shut-off valve.

In order that valve 24 may be moved manually as well as electrically to its outermost position a bolt 41, which is a feature of this invention, is slidably mounted in a vertically disposed opening 42 in valve body 35. Cooperating with this bolt is a pin 43 arranged in a horizontally disposed opening 44 extended into opening 42 from the back of body 35 in line with armature 33. This latter pin is adapted to engage at one end the back of armature 33 and to bear at the other end against bolt 41 which is tapered at 45. The construction of the two are such that when bolt 41 is moved to the position shown in Figs. 1 and 2 pin 43 engages the flat side of the bolt and holds armature 33 in a position urging valve 24 to close duct 21a. With this arrangement the force of spring 36 and weight of the armature bearing again pin 43 is sufficient to cause it to engage bolt 41 with sufficient force to normally hold the latter in its upper position.

As shown in Figs. 1 and 2, bolt 41 and pin 43 are so constructed and dimensioned that they do not quite force the lower end of armature 33 against the lower leg of core 31, a space 46 being allowed therebetween. By reason of this, when coil 32 is energized and armature 33 thereby drawn tightly against core 31, the pressure on pin 43 is released and bolt 41 consequently falls, due to gravity, to its lower position as shown in Figs. 3, 4 and 5. The bolt is mounted vertically beside stem 28 to afford such operation by gravity, its downward movement being limited by a set screw 47 and spring 36 permits armature 33 to move in the manner indicated without injury to valve 24.

With such an arrangement valve 24 can be set manually by forcing bolt 41 to its upper position to cause valve 6 to operate as a regulating valve when no current is in coil 32 so that a furnace or burner connected to be governed by valve 6 may be set in operation without a control circuit being completed through coil 32. However, due to the novel structure just referred to if current is applied to the actuating coil 32 at any time after the furnace or burner is started by manually raising bolt 41 armature 33 moves to close gap 46 whereby automatically releasing bolt 41 and placing the armature entirely under the control of coil 32.

For connecting coil 32 in a control circuit ends 51 and 52 of coil 32 are connected to a pair of terminal posts 53 and 54, respectively, which are mounted on an end plate 55 formed preferably of insulating material and attached to the end of arms 34. This plate is shaped to fit in the end of a tube 50 which forms a housing for the pilot valve mechanism. To provide for avoiding chattering of armature 33 when coil 32 is controlled by means of a sensitive thermostat such as is commonly used to control devices of this character, a pair of contacts 56 and 57 are employed to form a holding circuit for coil 32, as will appear more clearly hereinafter. These contacts are mounted on a pair of spring supports 58 and 59 which are attached to terminal posts 53 and 61, respectively, the springs being shaped to normally space the contacts from each other a distance equal to or slightly less than the gap 46 between armature 33 and core 31 when the armature is held up by bolt 41. For closing these contacts an arm 62 is attached to the free end of armature 33. This arm is so made that it will close the contacts only when the armature is held tightly against core 31 as it is when coil 32 is energized, but not when held up by bolt 41.

By way of illustrating this latter as well as various other features of the invention reference is had to the control circuit shown in Fig. 6 which illustrates diagrammatically a typical form of control employed with electrically controlled furnaces or heating appliances of that nature. In this circuit coil 32 and contacts 56 and 57 are shown schematically in the manner in which they are connected to terminal posts 53, 54, and 61. The complete circuit as shown is traced from terminal post 54 through a thermostatically operated switch 63 of the type commonly employed to open or close a circuit when a burner is operated or extinguished. In this instance switch 63 is intended to be placed adjacent a pilot burner in a furnace to open the control circuit when the gas supply to the furnace and the pilot light fails. From switch 63 the circuit extends to a second switch 64. This latter switch is of the type operated by the water level or steam pressure in the furnace and like switch 63 is adapted to open the control circuit when the water or steam pressure, whichever it is operated by, exceeds a safe value. From switch 64 the circuit extends to a current supply transformer 65 or other suitable current supply and from thence to a room thermostat 66. While this may be of any suitable form, it is illustrated here as a well known bi-metallic type of thermostat carrying a pair of contacts 67 and 68 for completing the circuit to coil 32 in accordance with temperature in the room where it is located. Cooperating with movable contacts 67 and 68 are a pair of rigid contact members 69 and 71, member 71 being connected with terminal post 53 and member 69 to post 61.

When this circuit is energized and switches 63 and 64 are closed coil 32 is controlled by thermostat 66. Assume that the room in which the thermostat is located is warmer than is desired. Under such conditions the thermostat will be set to assume the position shown in the drawings. As the room cools arm 60 of the thermostat moves to close contacts 67 and 69 and 68 and 71 in the sequence named. Inasmuch as coil 32 is deenergized when the contacts are separated contacts 56 and 57 are also open, consequently the closing of contacts 67 and 69 does not cause coil 32 to be energized. It is energized however as soon as contact 68 engages contact 71. And when it does, as set forth above, arm 62 on armature 33 closes contacts 56 and 57. Conversely when the room containing thermostat 66 becomes too warm again arm 60 moves away from contact members 69 and 71 and in doing so causes contact 68 to separate from contact 71 previous to contact 67 separating from contact 69 which is opposite to the order in which these contacts make engagement when they are closed.

From the foregoing, it will be appreciated that the circuit through the contact members 56 and 57 is an auxiliary or temporary holding circuit for coil 32 which functions to prevent chattering of armature 33 and valve 34. In normal operation thermostat 66 is adjusted so that it requires a few degrees change in temperature to cause it to move arm 60 sufficiently to close contact 68 after contact 67 closes and conversely to open contact 67 after contact 68 opens. Because of this and due to contacts 56 and 57 being normally open armature 33 and valve 24 are not moved by coil 32 as thermostat 66 heats up until contact 68 engages contact 71 and as contacts 56 and 57 are closed when coil 32 is energized the circuit through the coil is not broken as the thermostat cools until contact 67 moves away from contact 69. Frequently thermostats such as contemplated by thermostat 66 are so sensitive as referred to hereinbefore that the normal vibrations to which most buildings are subjected cause them to open and close a control circuit extended through them at critical temperatures. Such operation if not prevented produces chattering in the apparatus controlled by the thermostat which is very undesirable as is well known. This difficulty is positively overcome by the above described auxiliary holding circuit for coil 32 as in accordance therewith it requires several degrees change in temperature in thermostat 66 to reestablish the circuit to coil 32 after it is once broken or to break it after it is established. The amount of change in temperature required to afford this protection is preferably made only sufficient to overcome such trouble so as to maintain the sensitivity of the control determined by thermostat 66 at a maximum.

In accordance with the invention assuming valve 6 to be connected in a supply line to a burner or furnace, the burner or furnace may be operated when pilot valve 24 is seated on the valve chamber end of conduit 21a and prevented from operating when seated on the valve chamber end of conduit 22. Under these alternate conditions diaphragm 12 is subjected to the pressure on the burner side of valve 6 or that on the inlet side of the valve. The former causes it to control valve 6 as a pressure regulating valve determined by weight 18 and the latter as a positive shut-off valve. When the pilot valve control mechanism is deenergized as it normally is, armature 33 is held away from core 31 by spring 36 and its own unbalanced weight. In this position valve 24 is seated over duct 22 and valve 6 thereby caused to operate as a shut-off valve. When it is desired to operate the burner or furnace controlled by valve 6 assuming the pilot light of the burner is burning, the control circuit for coil 32 is energized. With the energization of coil 32 armature 33 is moved against core 31 and valve 24 over the end of duct 21a. With duct 21 closed and chamber 4 connected to chamber 14 diaphragm 12 is rendered responsive to the gas pressure on the burner side of valve 6. Consequently valve 6 is operated as a regulating valve due to the pressure in chamber 3 acting on diaphragm 8 tending to open valve 6, and levers 15 tending to close it when sufficient pressure is present in chamber 14 to lift diaphragm 12 against the gravity of weight 18. With the use of a circuit for coil 32, such as shown in Fig. 6, the coil is energized, assuming switches 63 and 64 are closed, as soon as contact member 68 on thermostat 66 engages contact member 71 which occurs at any temperature which the thermostat may be set to operate for such purposes. With the energization of coil 32 armature 33 moves against core 31 carrying valve 24 with it and seating it on the end of duct 21a. With this movement of the armature the contact arm 62 engages contact member 56 and forces it against contact member 57 whereby a holding circuit through contacts 67 and 69 on thermostat 66 is established. With the establishment of this circuit coil 32 is maintained energized until thermostat 66 heats up sufficient to open contacts 67 and 69. Consequently opening of the circuit by vibration of arm 60 on thermostat 66 is prevented since more than mere vibration is required to open contact 68 after 67 is closed. Similarly when the thermostat cools sufficiently to open contact 68 the armature falls and contacts 56 and 57 open, consequently the thermostat will not reestablish a circuit for the coil 32 until contact 67 is closed.

If an unsafe steam pressure is developed in the furnace it will open switch 64 which in turn deenergizes coil 32 with the result that armature 33 is released and valve 24 carried to its seat on the end of duct 22 causing valve 6 to close. In a like manner if the gas to the furnace fails and the pilot light goes out switch 63 opens shutting valve 6. Hence, such a control not only affords automatic temperature regulation but also protects the user both against destruction of the furnace by excess steam pressure (or it may be water level control) and against a flood of gas in case the gas supply fails long enough for the fire to go out and is then resumed or if for any other reasons the fire is extinguished.

In the absence of current for operating the control circuit because of supply failure or any other reason valve 6 may be manually rendered operative as a regulating valve by merely forcing the bolt 41 upward sufficiently to lift armature 33. When this is done pin 43 engages the side of bolt 41 and holds valve 24 seated on the end of duct 21a. To cause valve 6 to operate as a shut-off valve under these conditions bolt 41 may be manually returned to its lower position. If the control circuit is established when bolt 41 is in its upper position and coil 32 energized, armature 33 will move to close gap 46 and thereby automatically release pin 43 whereby allowing bolt 41 to fall to its lower position, and placing armature 33 and valve 24 entirely under the control of coil 32.

As will be readily appreciated from the foregoing, a magnetically operable valve mechanism is provided which is simple of construction, dependable in operation and which, while not necessarily so limited, is particularly adapted for use as a pilot valve control for gas flow regulating valves. An outstanding feature of the invention resides in the novel form of manual control provided in the device which, as will be readily understood from the foregoing, permits manual operation in case of current failure in the control system and automatically releases itself when the current in the control circuit is reestablished.

We claim:

1. A valve mechanism comprising a valve, an armature operably coupled to said valve, a solenoid for moving said armature and valve in a given direction, resilient means normally urging said armature and valve in a different direction, means for connecting said solenoid in a control circuit, a switch arranged adjacent said armature for establishing a secondary circuit for the solenoid, means on said armature for closing said switch when the armature is acted upon by said solenoid, and manual means for moving said armature to substantially its magnetic circuit closing position, said manual means being adapted to release itself automatically when the solenoid is energized.

2. A valve mechanism comprising a valve casing, a valve mounted upon a valve stem arranged for reciprocatory movement in a horizontal plane in said casing, a frame secured to said casing, a magnet mounted in said frame, an armature pivotally mounted adjacent said magnet for movement thereby, means connecting said valve stem to said armature for movement therewith, resilient means urging said armature away from said magnet, and manually operable means mounted in said casing for moving said armature toward said magnet, said means being adapted by the aid of said resilient means to hold said armature in a selected position but to automatically render itself inactive upon a further movement of the armature toward the magnet.

3. A valve mechanism comprising a valve casing, a valve stem having a valve attached thereto arranged for movement in said casing, a frame secured to said casing, a magnet for operating said valve mounted in said frame, an armature pivotally mounted adjacent said magnet, means operably coupling said armature to said valve stem whereby said valve is caused to move with the armature, means normally urging said armature away from said magnet, a manually operable bolt mounted for vertical movement in said casing and a pin similarly mounted for horizontal movement, said pin being adapted to be engaged by said bolt and to move said armature toward said magnet when said bolt is raised, and in addition to releasably hold said bolt in its raised position by reason of the force applied thereto by said resilient means when said armature is spaced a selected distance from said magnet.

4. A valve mechanism comprising a valve casing, a valve stem having a valve attached thereto arranged for movement in said casing, a frame secured to said casing, a magnet for operating said valve mounted in said frame, an armature pivotally mounted adjacent said magnet, means operably coupling said armature to said valve stem whereby said valve is caused to move with the armature, means normally urging said armature away from said magnet, a manually operable bolt mounted for vertical movement in said casing and a pin similarly mounted for horizontal movement, said pin being adapted to be engaged by said bolt and to move said armature toward said magnet when said bolt is raised and in addition to releasably hold said bolt in its raised position by reason of the force applied thereto by said resilient means when said armature is spaced a selected distance from said magnet, means for connecting said magnet in a control circuit, and a switch arranged to be operated by said armature when said magnet is energized for establishing an auxiliary circuit through said magnet.

5. A valve mechanism comprising a valve, an armature operably coupled to said valve, manually operable means for moving said armature and valve from one position to another, a solenoid for moving said armature and valve in the same direction as said manually operable means and adapted when energized to render said manually operable means inactive, a spring normally urging said armature away from said solenoid, means for connecting said solenoid in a control circuit, and a switch operated by said armature when the solenoid is energized for establishing a holding circuit therefor.

In testimony whereof, we hereunto sign our names.

CHARLES HOWARD HOOK.
NATHAN L. MERCUR.